US008355506B2

(12) United States Patent  
Smith

(10) Patent No.: US 8,355,506 B2  
(45) Date of Patent: Jan. 15, 2013

(54) DIGITAL VIDEO RECORDER ANTI-SKIP SYSTEM

(75) Inventor: Perry Smith, Maale Adumim (IL)

(73) Assignee: NDS Limited, Staines, Middlesex (GB)

( * ) Notice: Subject to any disclaimer, the term of this patent is extended or adjusted under 35 U.S.C. 154(b) by 773 days.

(21) Appl. No.: 11/992,614

(22) PCT Filed: Nov. 17, 2005

(86) PCT No.: PCT/IL2005/001221
§ 371 (c)(1),
(2), (4) Date: May 6, 2008

(87) PCT Pub. No.: WO2007/057876
PCT Pub. Date: May 24, 2007

(65) Prior Publication Data
US 2009/0097646 A1 Apr. 16, 2009

(51) Int. Cl.
*H04N 7/167* (2011.01)
(52) U.S. Cl. ............ 380/210; 380/200; 725/25; 725/31; 386/258; 386/259; 386/260
(58) Field of Classification Search .................. 725/25, 725/29, 31, 51, 52; 380/200, 205, 209, 210, 380/239, 230, 231; 386/248, 249, 250, 257, 386/258, 259, 260
See application file for complete search history.

(56) References Cited

U.S. PATENT DOCUMENTS

| 5,613,004 | A | 3/1997 | Cooperman et al. | |
|---|---|---|---|---|
| 6,353,672 | B1 | 3/2002 | Rhoads | |
| 6,654,547 | B1 | 11/2003 | Maeda et al. | |
| 7,092,615 | B2 * | 8/2006 | Tanikawa et al. | 386/351 |
| 7,356,144 | B2 * | 4/2008 | Nishimoto et al. | 380/210 |
| 2002/0105839 | A1 * | 8/2002 | Sugahara et al. | 365/200 |
| 2002/0106192 | A1 * | 8/2002 | Sako | 386/94 |
| 2002/0108043 | A1 | 8/2002 | Tanaka | |
| 2004/0028226 | A1 | 2/2004 | Saar et al. | |
| 2005/0055312 | A1 * | 3/2005 | Wilson et al. | 705/51 |
| 2007/0067800 | A1 | 3/2007 | Wachtfogel et al. | |

FOREIGN PATENT DOCUMENTS

| EP | 1 013 088 B1 | 1/2003 |
|---|---|---|
| JP | 10-164550 | 6/1998 |
| JP | 2004-312652 | 11/2004 |
| WO | WO 00/01149 | 1/2000 |

OTHER PUBLICATIONS

"Advanced Encryption Standard (AES)" (Federal Information Processing Standards Publication 197, Nov. 26, 2001).

(Continued)

*Primary Examiner* — Jeffrey D Popham
*Assistant Examiner* — Daniel Potratz
(74) *Attorney, Agent, or Firm* — Husch Blackwell LLP

(57) ABSTRACT

A method for producing scrambled content (FIG. 6A), the method including providing content (600) to be scrambled, identifying a first portion of the content (620), identifying a second portion of the content (630), computing a disguising function of at least part of the first portion (620) of the content and producing a result, and scrambling the second portion (630) of the content, the scrambling being based in part, on the result. Related apparatus and methods are also described.

14 Claims, 16 Drawing Sheets

OTHER PUBLICATIONS

"Data Encryption Standard (DES)" (Federal Information Processing Standards Publication 46-3, Oct. 25, 1999).

"Digital Video Broadcasting (DVB); Support for Use of Scrambling and Conditional Access (CA) within digital broadcasting systems" ETR 289 (European Telecommunications Standards Institute, Oct. 1996).

"Secure Hash Standard" (Federal Information Processing Standards Publication 180-1, Apr. 17, 1995).

* cited by examiner

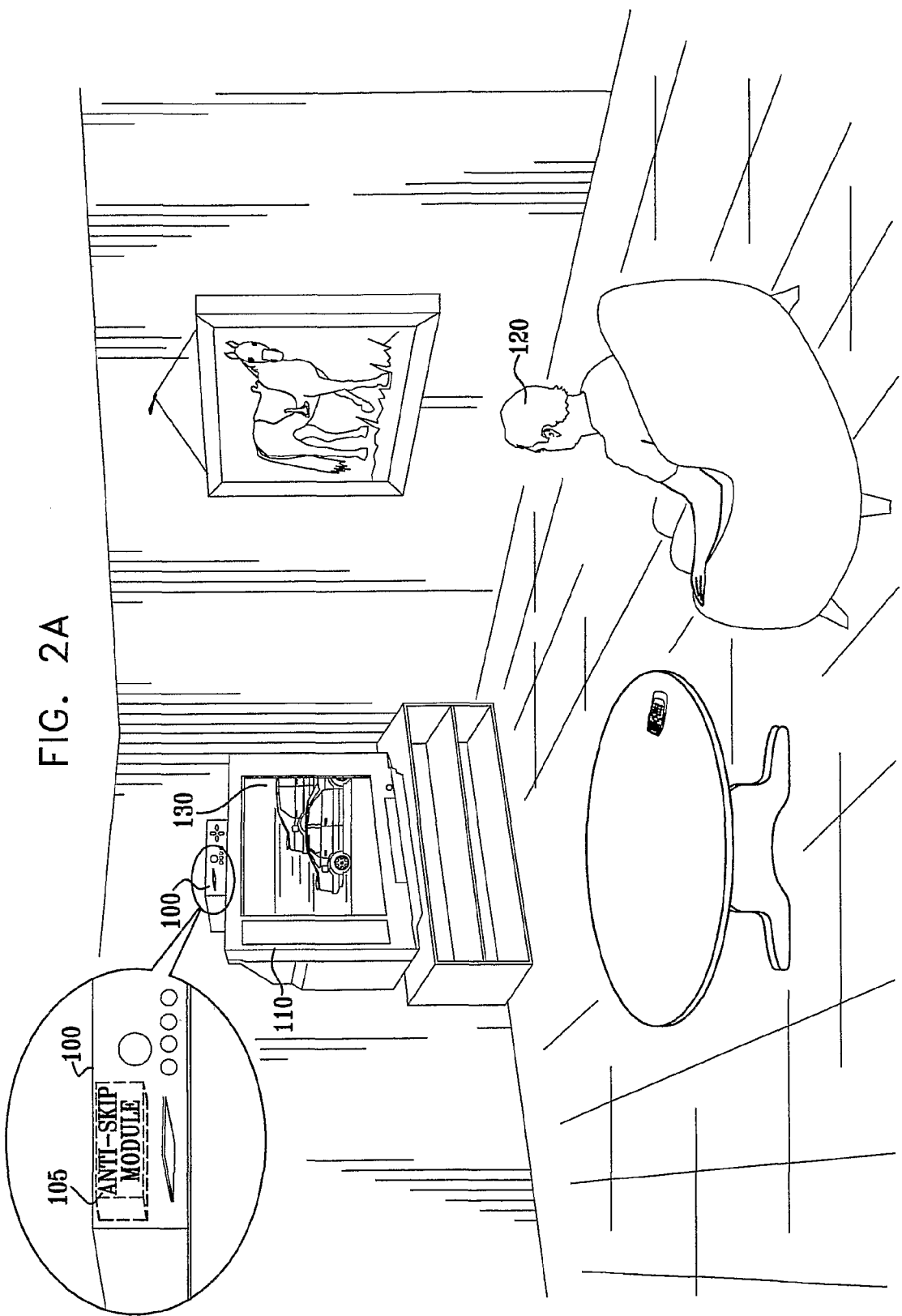

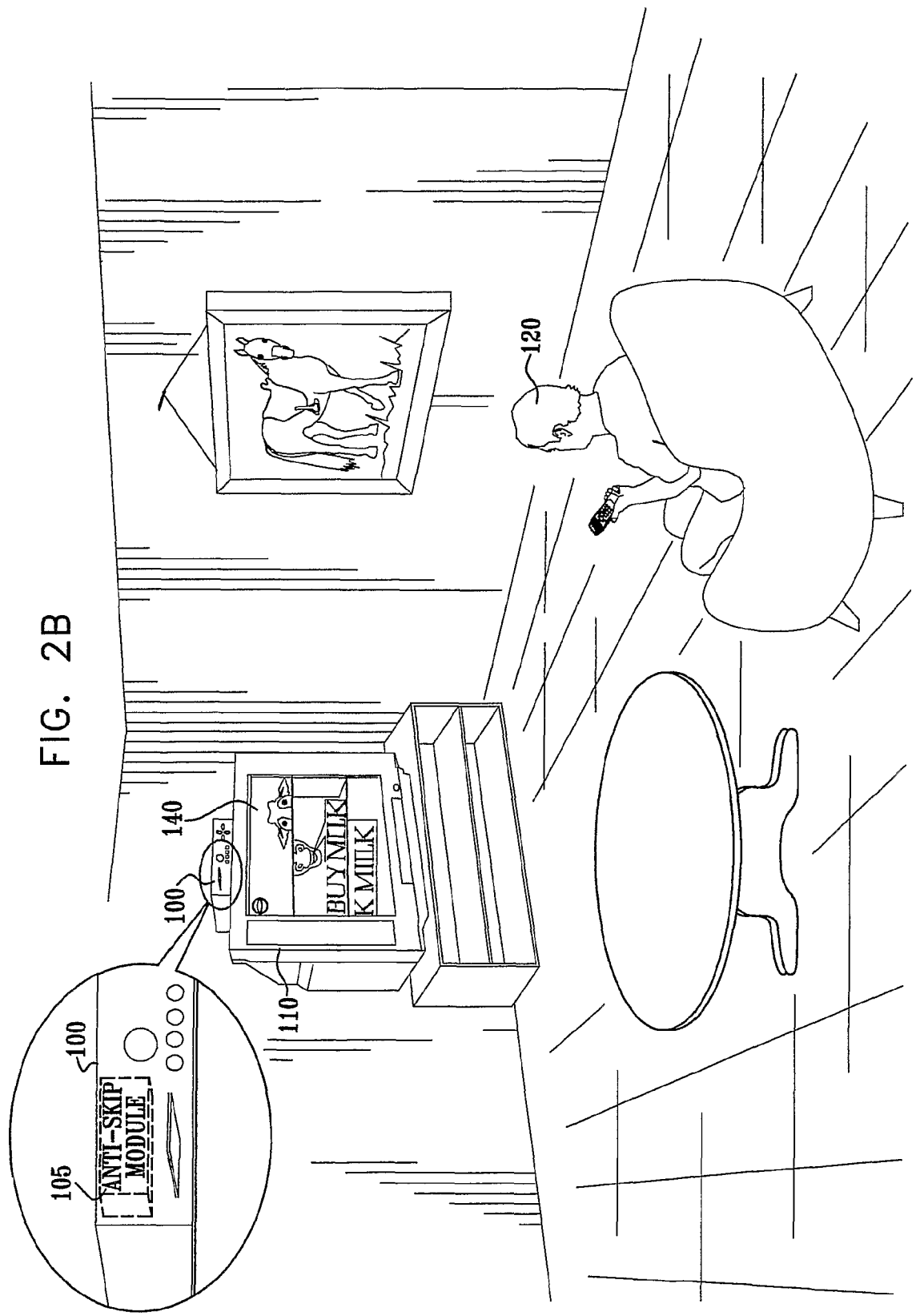

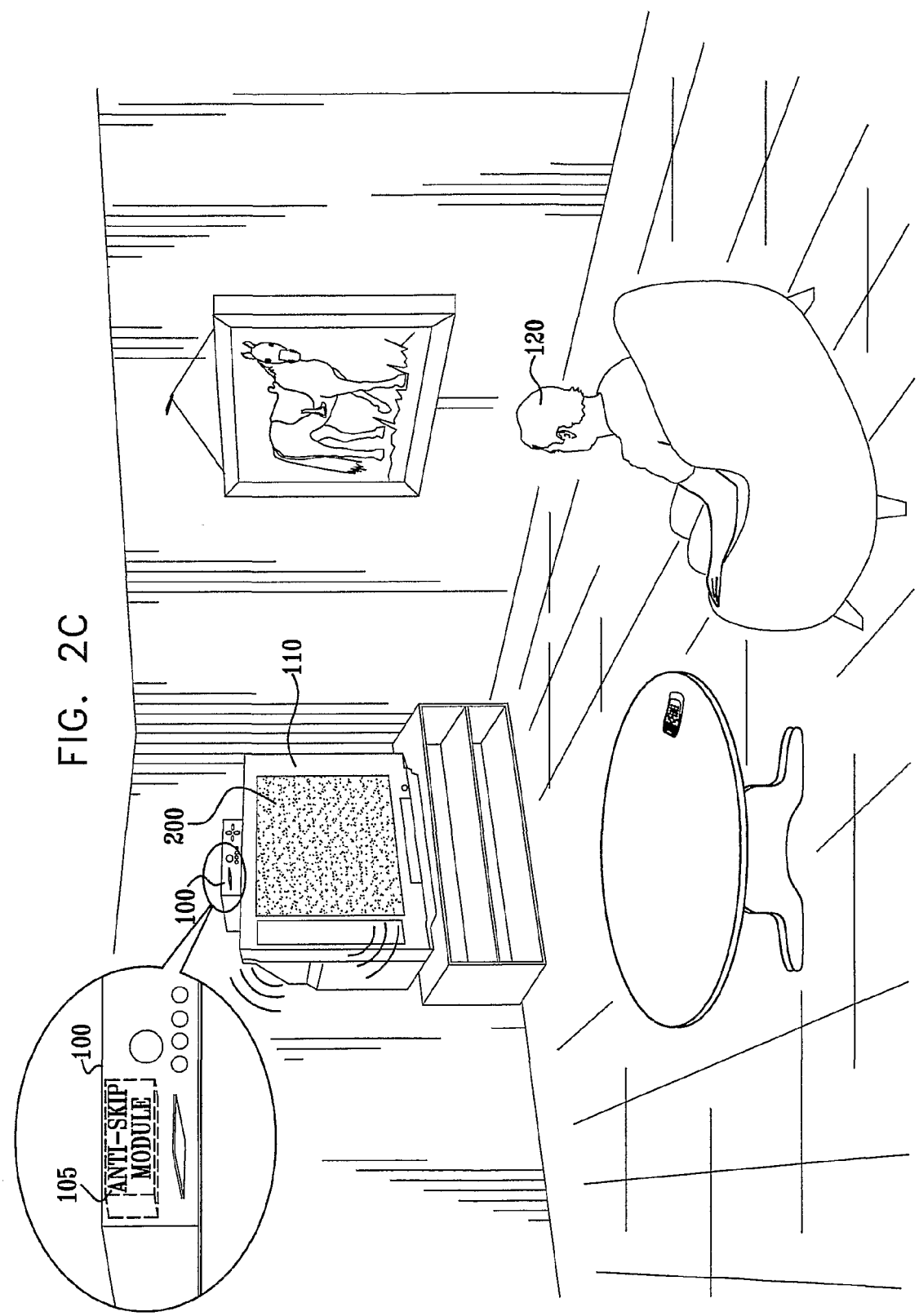

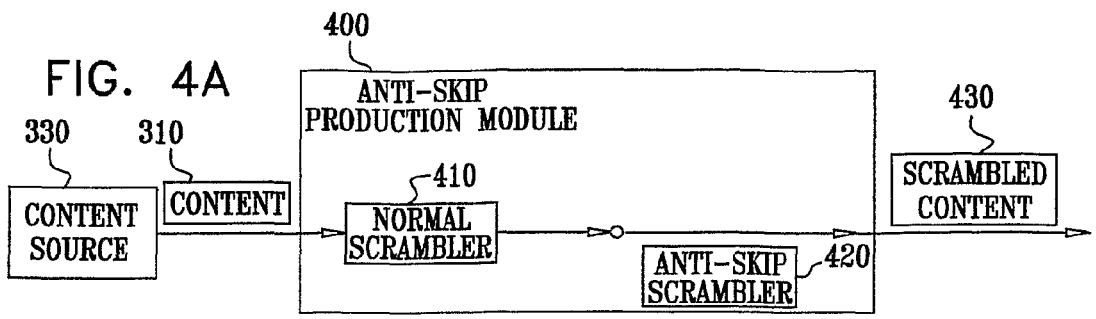
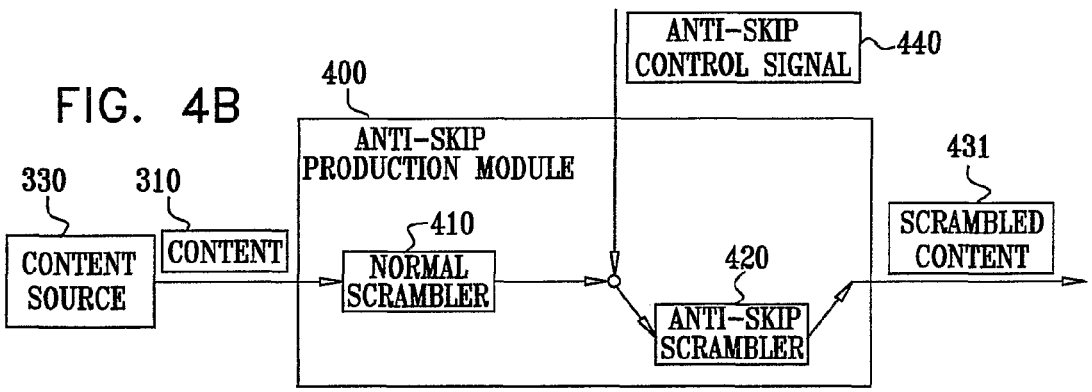
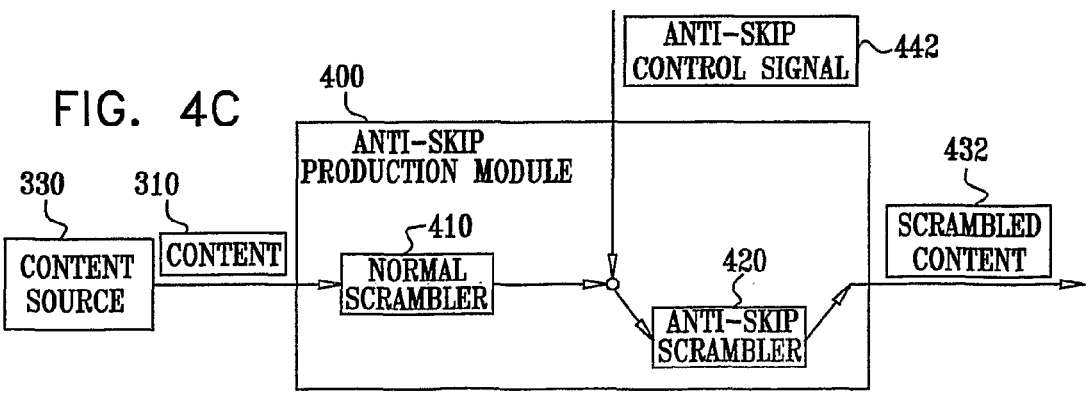

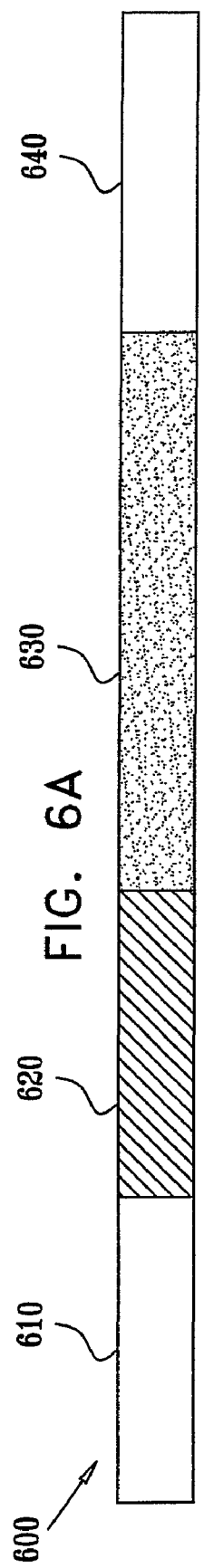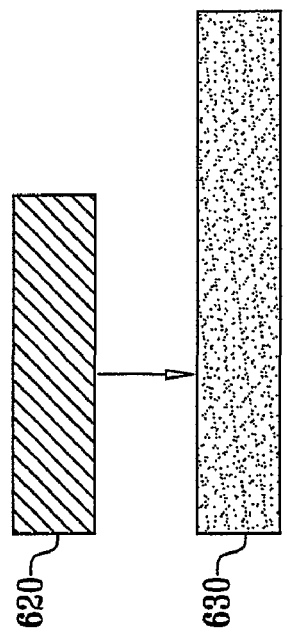

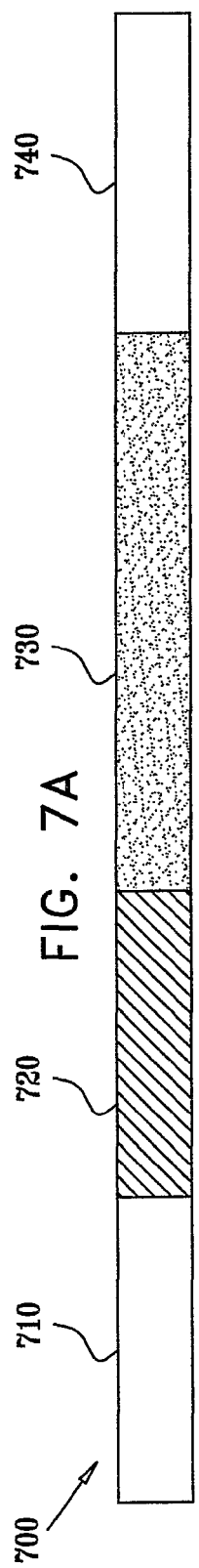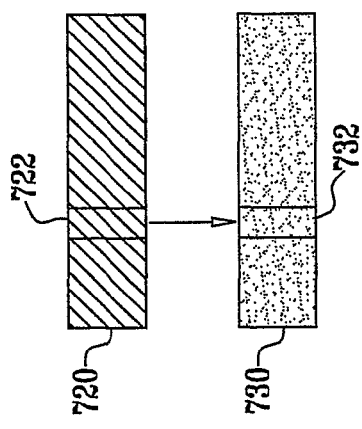
FIG. 7A
FIG. 7B

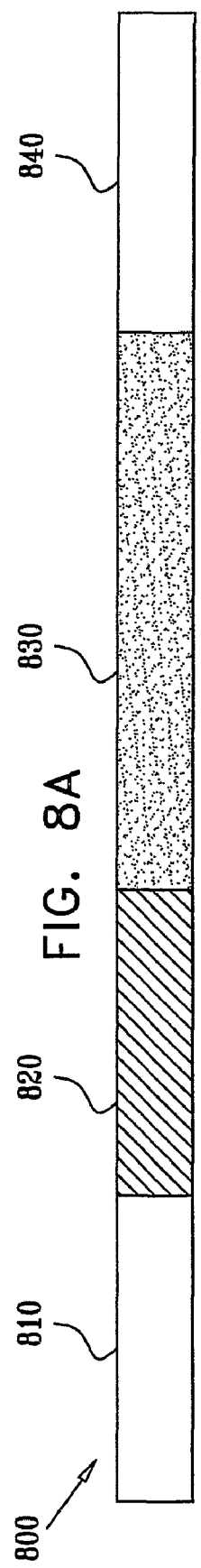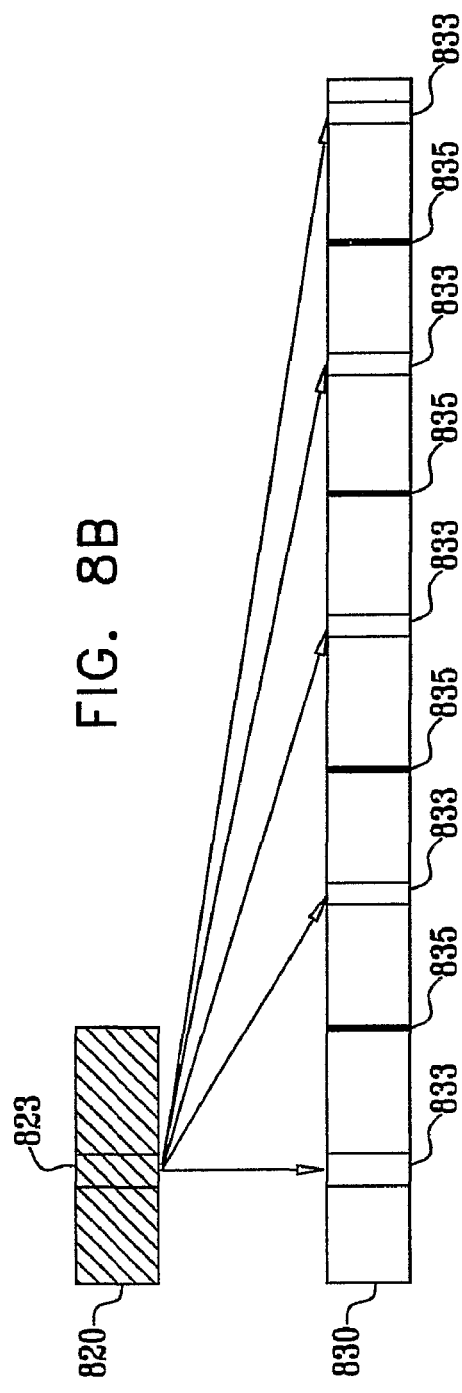

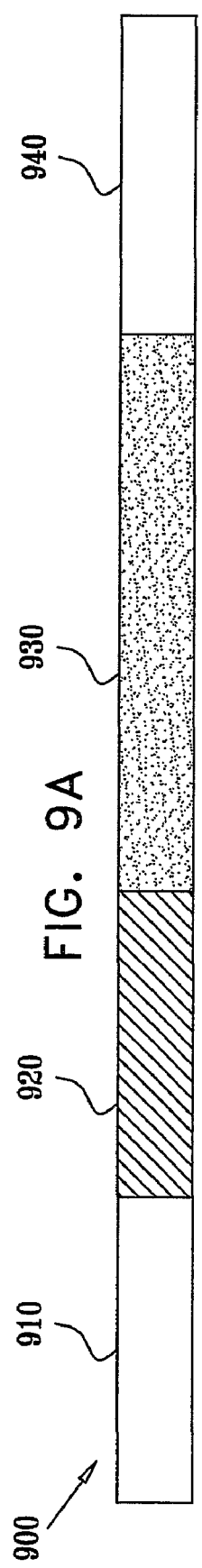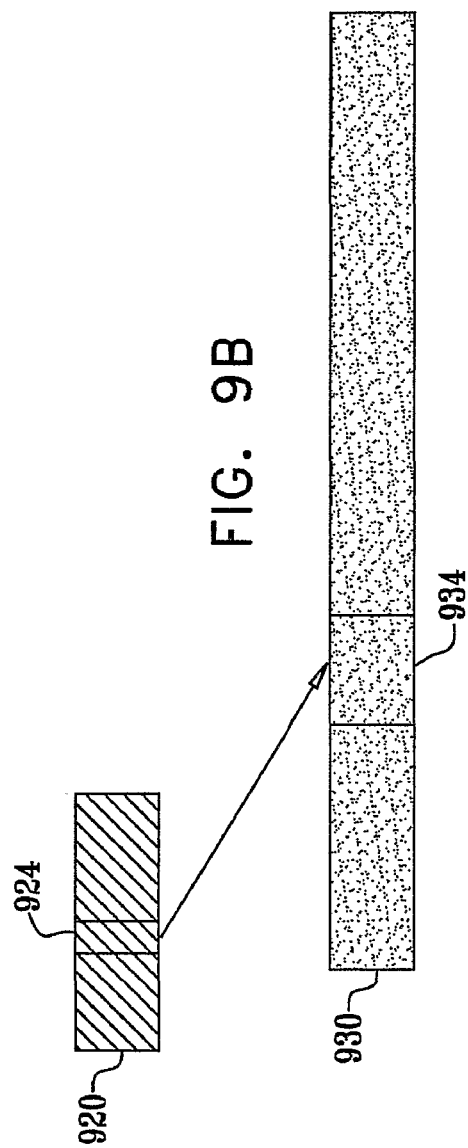

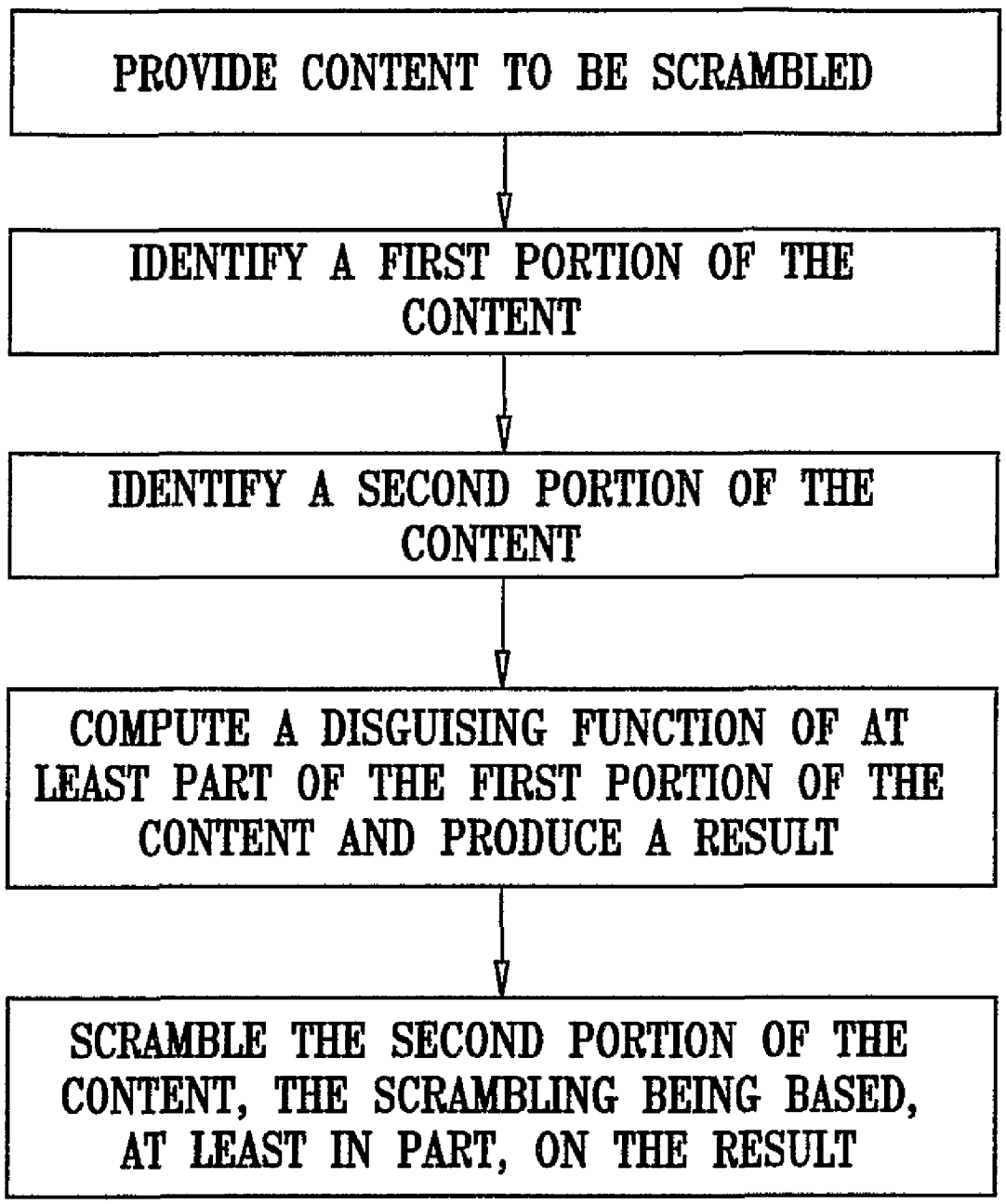

DIGITAL VIDEO RECORDER ANTI-SKIP SYSTEM

RELATED APPLICATION INFORMATION

The present application is a 35 USC §371 application of PCT/IL2005/001221, filed on 17 Nov. 2005 and entitled "Digital Video Recorder Anti-Skip System", which was published in the English language on 24 May 2007 with International Publication Number WO 2007/057876.

FIELD OF THE INVENTION

The present invention relates to digital video recorders, and particularly but not exclusively to systems for preventing or discouraging viewers from skipping commercial advertisements.

BACKGROUND OF THE INVENTION

Devices which digitally record and play back TV programs, known as PVRs (Personal Video Recorders), are well known and widely available. One example of a PVR is the XTV™ system, commercially available from NDS Limited, One Heathrow Boulevard, 286 Bath Road, West Drayton, Middlesex UB7 0BQ, United Kingdom. Another example of such a system is manufactured by Tivo Inc., 2160 Gold Street, Alviso, Calif. 95002-2160, USA.

PVRs are also known as Digital Video Recorders (DVRs). The term "PVR", in all its grammatical forms, is used throughout the present specification and claims interchangeably with the term "DVR" and its corresponding grammatical forms.

PVRs are described in the following patents and patent applications, the disclosures of which are hereby incorporated herein by reference: PCT Published Patent Application WO 00/01149 of NDS Limited; corresponding European Patent 1 013 088 to NDS Limited; and U.S. patent application Ser. No. 09/515,118 of Wachtfogel et al, assigned to NDS Limited.

TV programs often have breaks for commercial advertisements inserted into the program flow. Broadcasters have an interest in having viewers watch the commercial advertisements, as they are a source for the broadcasters' income. Television viewers are often impatient with commercial advertisements, and when a program is played back from a recording, viewers fast-forward through the commercial advertisement break, thus "skipping" the commercial advertisement break.

Skipping commercial advertisements is easy when using PVRs. In fact, some PVRs support the skipping by providing a specific PVR playback function which enables skipping 30 seconds of programming, which is especially useful for skipping a typical commercial advertisement.

The following references are believed to represent the state of the art:

U.S. Pat. No. 6,654,547 to Maeda et al;

US Published Patent Application 2004/0028226 of Saar et al;

PCT Published Patent Application WO 00/01149 of NDS Ltd, corresponding European Patent 1 013 088 of NDS Ltd., and corresponding U.S. patent application Ser. No. 09/515, 118 of Wachtfogel et al;

SHA-1, Secure Hash Standard, described in FIPS 180-1 (Federal Information Processing Standards Publication 180-1), found on the World Wide Web at www.itl.nist.gov/fips-pubs/fip180-1.htm;

AES described in FIPS 197 (Federal Information Processing Standards Publication 197), found on the World Wide Web at csrc.nist.gov/publications/fips/fips197/fips-197.pdf;

DES described in FIPS 46-3 (Federal Information Processing Standards Publication 46-3), found on the World Wide Web at csrc.nist.gov/publications/fips/fips46-3/fips46-3.pdf; and DVB-CSA described in ETSI Technical Report ETR 289, of October 1996, published by the European Telecommunications Standards Institute.

The disclosures of all references mentioned above and throughout the present specification, as well as the disclosures of all references mentioned in those references, are hereby incorporated herein by reference.

SUMMARY OF THE INVENTION

The present invention seeks to provide an improved system for discouraging viewers from skipping commercial advertisements.

In preferred embodiments of the present invention, a dependency between playing back of one portion of a recorded program and playing back of another portion of a recorded program is produced. The dependency can be used for different purposes. By way of a non-limiting example, the dependency can be used to make the playing back of at least a portion of a program contingent on viewing a commercial advertisement break which precedes the portion.

Generally, PVRs record compressed video and audio programs; in some cases, PVRs record scrambled compressed programs. When PVRs play back programs, the PVRs decompress the compressed recording; in the cases in which the recording is scrambled, the PVRs decompress and also descramble the recorded programs.

The present invention, in preferred embodiments thereof, by way of a non-limiting example, requires normal playing back of at least part of the content of a commercial in order to calculate a disguising function of that part of the commercial, the result of the disguising function being necessary to descramble the subsequent program.

The term "must see" is used throughout the present specification to refer to a part, or a section, of a program upon which viewing of a subsequent part or section of the program depends.

The term "skip", in all its grammatical forms, is used throughout the present specification and claims both to refer to playing back at a fast-forward rate, and to refer to "jumping over" a portion of a program for a short time period, such as, by way of a non-limiting example, up to five minutes.

The terms "play back normally" and "normal playback", in all their grammatical forms, are used throughout the present specification and claims to refer to playing back a recorded program at a normal rate, without skipping.

The term "dependent section" is used throughout the present specification and claims to refer to a part, or a section, of a program for which successful descrambling depends on normal playback of the "must see".

The present invention, in preferred embodiments thereof, enables differentiating between when a viewer is "legitimately" skipping audio/video data and when the viewer is skipping audio/video data to bypass commercials. By way of a non-limiting example, when a viewer normally plays back at least one minute of viewing before a commercial advertisement break, then requests to skip a period of the program of 5 minutes or less, and during the period to be skipped a commercial break is scheduled, the viewer may be judged to be attempting to skip a commercial break.

There is thus provided in accordance with a preferred embodiment of the present invention a method for producing scrambled content, the method including providing content to be scrambled, identifying a first portion of the content, identifying a second portion of the content, computing a disguising function of at least part of the first portion of the content and producing a result, and scrambling the second portion of the content, the scrambling being based, at least in part, on the result.

Further in accordance with a preferred embodiment of the present invention the second portion is adjacent to the first portion.

Still further in accordance with a preferred embodiment of the present invention the content includes at least one of the following video content, audio content, and audio-video content.

Additionally in accordance with a preferred embodiment of the present invention the disguising function includes a hash function.

Moreover in accordance with a preferred embodiment of the present invention the hash function includes SHA-1.

Further in accordance with a preferred embodiment of the present invention the disguising function includes exclusive-or (XOR).

Still further in accordance with a preferred embodiment of the present invention the disguising function includes DES.

Additionally in accordance with a preferred embodiment of the present invention the disguising function includes AES.

Moreover in accordance with a preferred embodiment of the present invention the first portion includes n sub-portions, and the computing a disguising function includes separately computing the disguising function for each of the n sub-portions, and the result includes n sub-results, and the scrambling includes scrambling n sub-portions of the second portion of the content, the scrambling of each one of the n sub-portions of the second portion of the content being based, at least in part, on a corresponding one of the n sub-results.

Further in accordance with a preferred embodiment of the present invention each of the n sub-portions of the first portion includes exactly one byte.

There is also provided in accordance with another preferred embodiment of the present invention scrambled content including a first portion of the content, and a second portion of the content, wherein the second portion is scrambled based, at least in part, on a result of applying a disguising function to at least part of the first portion.

Further in accordance with a preferred embodiment of the present invention the second portion is adjacent to the first portion.

Still further in accordance with a preferred embodiment of the present invention the content includes at least one of the following video content, audio content, and audio-video content.

Additionally in accordance with a preferred embodiment of the present invention the disguising function includes a hash function.

Moreover in accordance with a preferred embodiment of the present invention the hash function includes SHA-1.

Further in accordance with a preferred embodiment of the present invention the disguising function includes exclusive-or (XOR).

Still further in accordance with a preferred embodiment of the present invention the disguising function includes DES.

Additionally in accordance with a preferred embodiment of the present invention the disguising function includes AES.

Moreover in accordance with a preferred embodiment of the present invention the first portion includes n sub-portions, and the applying a disguising function includes separately applying the disguising function for each of the n sub-portions, and the result includes n sub-results, and the scrambling includes scrambling n sub-portions of the second portion of the content, the scrambling of each one of the n sub-portions of the second portion of the content being based, at least in part, on a corresponding one of the n sub-results.

Further in accordance with a preferred embodiment of the present invention each of the n sub-portions of the first portion includes exactly one byte.

There is also provided in accordance with still another preferred embodiment of the present invention a method for using scrambled content, the method including providing scrambled content, identifying a first portion of the content, identifying a second portion of the content, descrambling the first portion of the content, only if the first portion of the content is scrambled, computing a disguising function of at least part of the first portion of the content and producing a result, and descrambling the second portion of the content, the descrambling being based, at least in part, on the result.

Further in accordance with a preferred embodiment of the present invention the second portion is adjacent to the first portion.

Still further in accordance with a preferred embodiment of the present invention the content includes at least one of the following video content, audio content, and audio-video content.

Additionally in accordance with a preferred embodiment of the present invention the disguising function includes a hash function.

Moreover in accordance with a preferred embodiment of the present invention the hash function includes SHA-1.

Further in accordance with a preferred embodiment of the present invention the disguising function includes exclusive-or (XOR).

Still further in accordance with a preferred embodiment of the present invention the disguising function includes DES.

Additionally in accordance with a preferred embodiment of the present invention the disguising function includes AES.

Moreover in accordance with a preferred embodiment of the present invention the first portion includes n sub-portions, and the computing a disguising function includes separately computing the disguising function for each of the n sub-portions, and the result includes n sub-results, and the scrambling includes scrambling n sub-portions of the second portion of the content, the scrambling of each one of the n sub-portions of the second portion of the content being based, at least in part, on a corresponding one of the n sub-results.

Further in accordance with a preferred embodiment of the present invention each of the n sub-portions of the first portion includes exactly one byte.

There is also provided in accordance with another preferred embodiment of the present invention apparatus for producing scrambled content from content to be scrambled, the apparatus including an anti-skip production module including an anti-skip scrambler, the anti-skip production module being operative to identify a first portion of the content, identify a second portion of the content, compute a disguising function of at least part of the first portion of the content and producing a result, and in the anti-skip scrambler, scramble the second portion of the content, the scrambling being based, at least in part, on the result.

Further in accordance with a preferred embodiment of the present invention the anti-skip production module also includes a normal scrambler operative to scramble another portion of the content not based on the result.

There is also provided in accordance with still another preferred embodiment of the present invention apparatus for using scrambled content, the apparatus including a discriminator for identifying a first portion of the content and a second portion of the content, an anti-skip descrambler for descrambling the first portion of the content, only if the first portion of the content is scrambled, computing a disguising function of at least part of the first portion of the content and producing a result, and descrambling the second portion of the content, the descrambling being based, at least in part, on the result.

Further in accordance with a preferred embodiment of the present invention the apparatus also includes a normal descrambler for descrambling another portion of the content not based on the result.

BRIEF DESCRIPTION OF THE DRAWINGS

The present invention will be understood and appreciated more fully from the following detailed description, taken in conjunction with the drawings in which:

FIGS. 2A-2D are simplified pictorial illustrations of the system of FIGS. 1A-1C, depicting a situation in which a user of the system is attempting to skip viewing a portion of programming;

FIGS. 4A-4C are simplified functional block diagram illustrations of an anti-skip production module, useful for producing content for use in the system of FIGS. 1A-1C, the anti-skip production module being constructed and operative in accordance with still another preferred embodiment of the present invention;

FIGS. 6A and 6B are simplified pictorial illustrations of portions of a recorded content item, useful in understanding a preferred embodiment of the system of FIGS. 1A-1C;

FIGS. 7A and 7B are simplified pictorial illustrations of the portions of the recorded content item of FIG. 6A, useful in understanding an alternative preferred embodiment of the system of FIGS. 1A-1C;

FIGS. 8A and 8B are simplified pictorial illustrations of the portions of the recorded content item of FIG. 7A, useful in understanding the alternative preferred embodiment depicted in FIG. 7A, operating when the portions are not equal in size;

FIGS. 9A and 9B are simplified pictorial illustrations of the portions of the recorded content item of FIG. 7A, useful in understanding another alternative preferred embodiment of the system of FIGS. 1A-1C;

FIG. 10 is a simplified flowchart illustration of a preferred method of producing scrambled content for use in the system of FIGS. 1A-1C.

DETAILED DESCRIPTION OF PREFERRED EMBODIMENTS

Figure 1A:
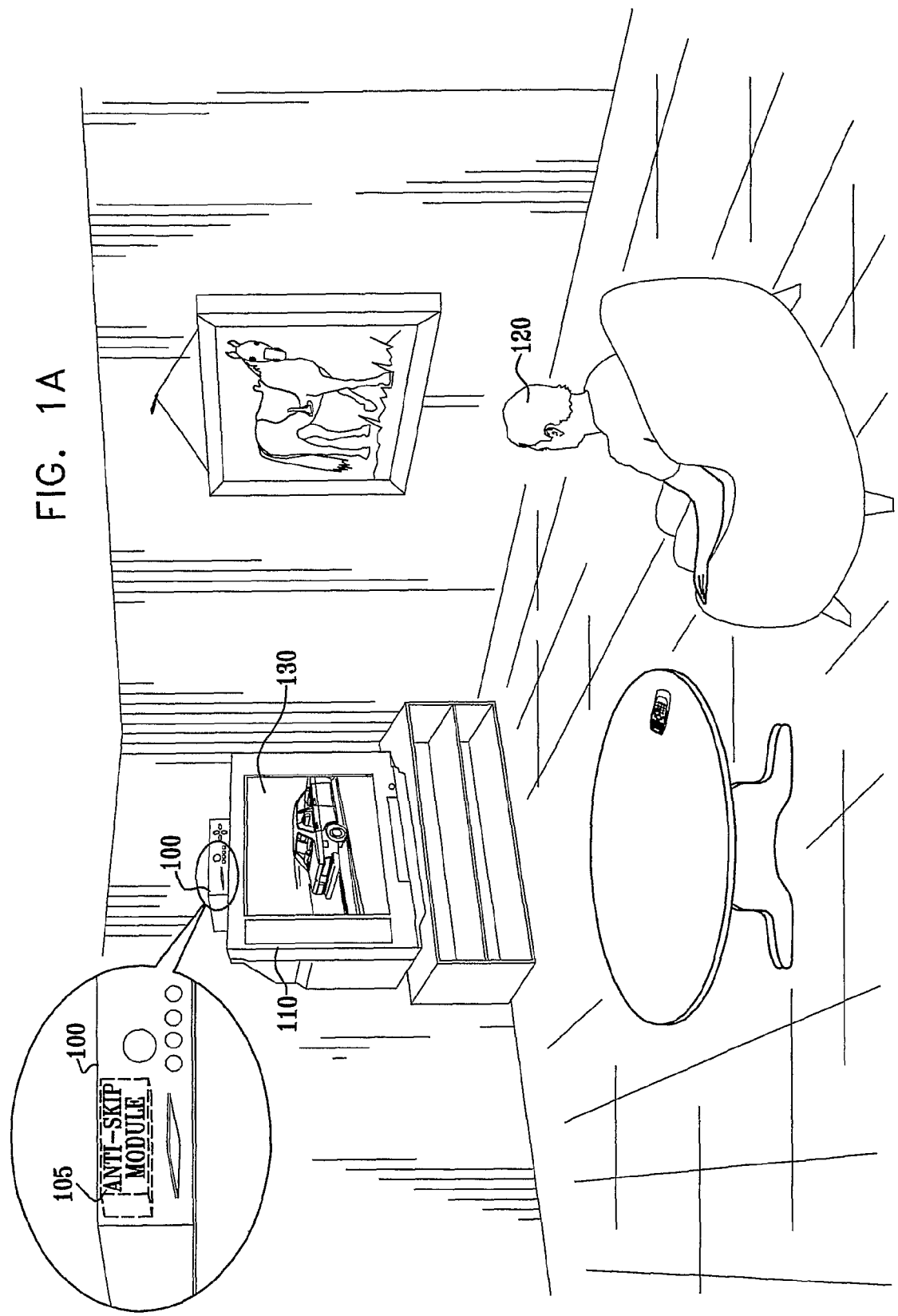
FIGS. 1A-1C are simplified pictorial illustrations of a PVR anti-skip system, constructed and operative in accordance with a preferred embodiment of the present invention.
Figure 1B:
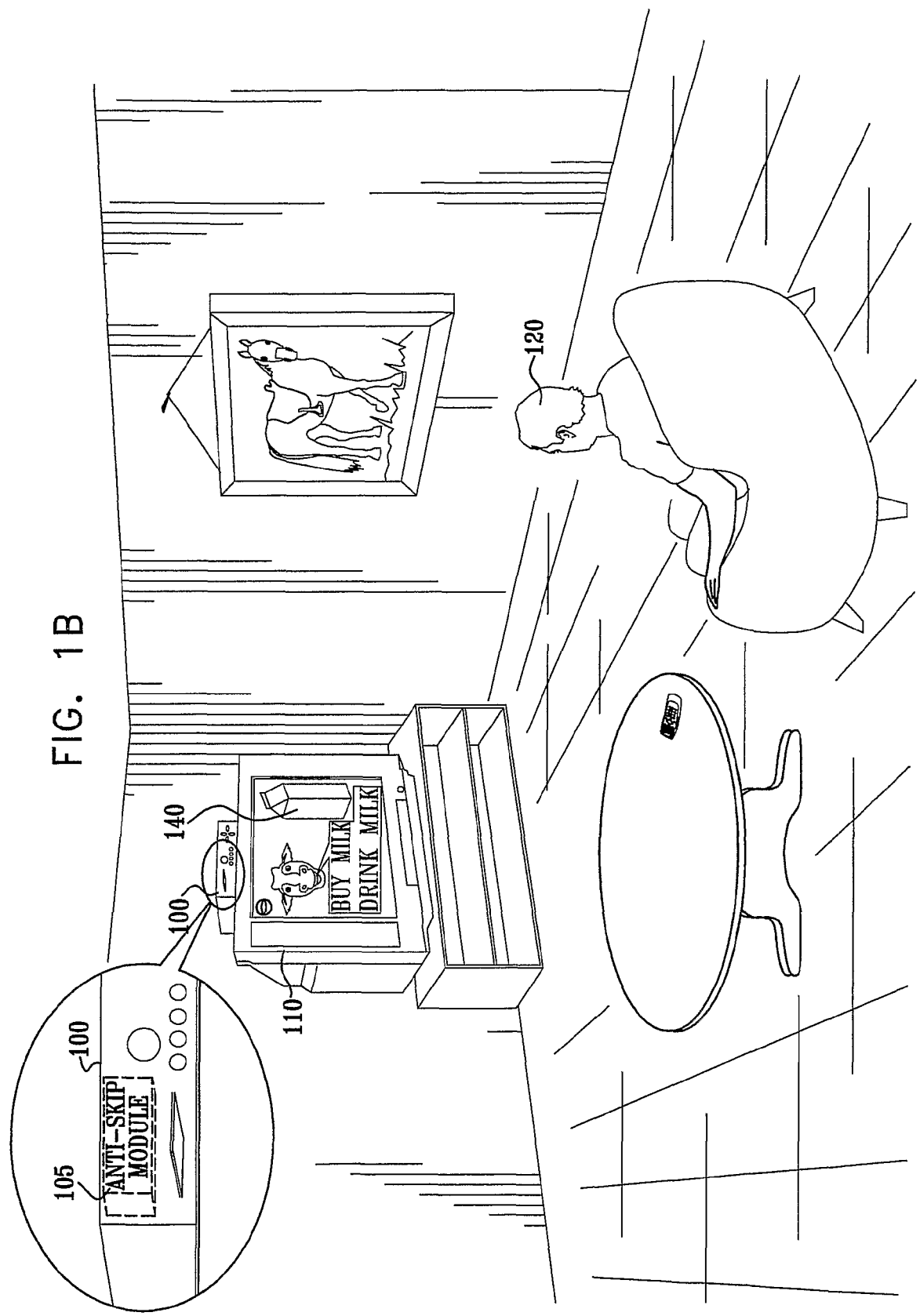
Figure 1C:
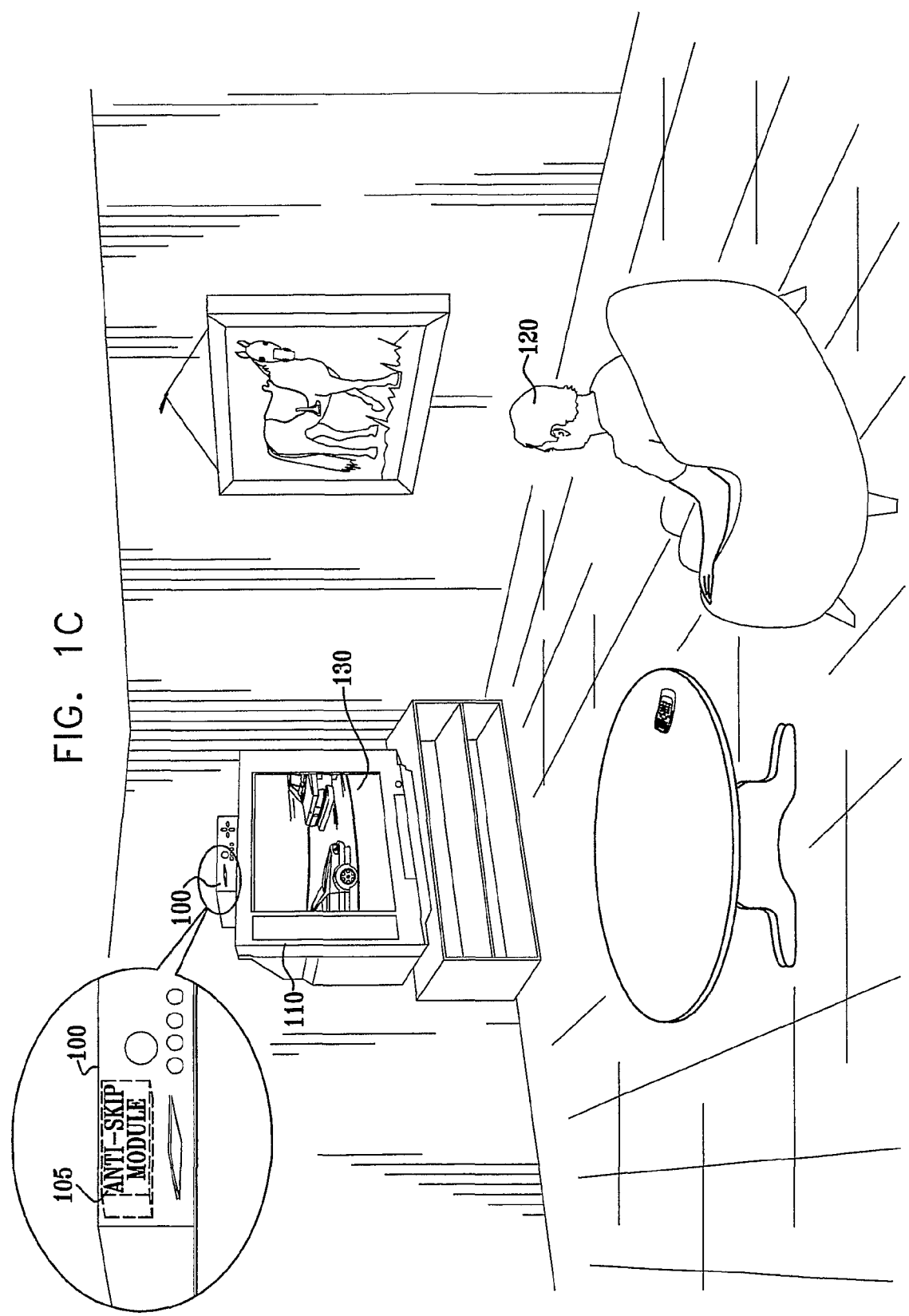

Reference is now made to FIGS. 1A-1C, which are simplified pictorial illustrations of a PVR anti-skip system, constructed and operative in accordance with a preferred embodiment of the present invention. FIGS. 1A-1C depict the PVR anti-skip system in a situation in which a user of the system is not attempting to skip viewing a portion of programming.

Referring specifically to FIG. 1A, the system of FIG. 1A comprises a PVR 100, which comprises an anti-skip module 105.

The PVR 100 is preferably implemented in any suitable combination of software and hardware, as is well known in the art. The PVR 100 preferably comprises, in addition to the anti-skip module 105, suitable conventional components (not shown), as are well known in the art. Non-limiting examples of conventional PVR systems well known in the art include:

the system described in PCT Published Patent Application WO 00/01149 of NDS Limited, corresponding European Patent 1 013 088 of NDS Limited, and corresponding U.S. patent application Ser. No. 09/515,118 of Wachtfogel et al, referred to above; and the XTV™ system, commercially available from NDS Limited, One London Road, Staines, Middlesex, TW18 4EX, United Kingdom.

A preferred implementation of the anti-skip module 105 is described in detail below with reference to FIGS. 5A-5C.

For simplicity's sake, FIG. 1A depicts a television display 110 and a PVR 100 separately. Alternatively, the television display 110 and the PVR 100 could be combined in one unit.

The operation of the system of FIGS. 1A-1C is now briefly described.

FIGS. 1A-1C depict a sequence of states, over time, of the system of FIG. 1A.

In FIG. 1A a viewer 120 is depicted watching a program 130, being normally played back by the PVR 100 on the television display 110. The program 130 does not comprise a "must see", and does not comprise a "dependent section". The viewer 120 views the program 130 displayed on the television display 110. In the case depicted in FIG. 1A, the anti-skip module 105 need not take any special action.

In FIG. 1B the viewer 120 is depicted watching a commercial advertisement break 140, being normally played back from the PVR 100 on the television display 110. The commercial advertisement break 140 comprises, by way of a non-limiting example, a "must see". The anti-skip module 105 computes a function of the "must see" comprised within the commercial advertisement break 140. A preferred method of computation of the function of the "must see" is described in more detail below with reference to FIG. 5A.

In FIG. 1C the viewer 120 is depicted watching a continuation of the program 130, being normally played back from the PVR 100 on the television display 110, after the commercial advertisement break 140 has ended. The continuation of the program 130 comprises a "dependent section", the descrambling of which depends on the result of the computation of the function of the "must see". The anti-skip module 105 uses the result of the computation of the function of the "must see" to descramble the "dependent section" following the "must see". A preferred method of using the result in order to descramble the "dependent section" is described in more detail below with reference to FIG. 5A.

FIGS. 1A-1C thus depict a viewer 120 viewing a program 130, followed by a commercial advertisement break 140, further followed by a "dependent section", being normally played back from a PVR 100. The viewer 120 does not perceive any break in normal viewing.

Reference is now made to FIGS. 2A-2D, which are simplified pictorial illustrations of the system of FIG. 1A-1C, depicting a situation in which a user of the system is attempting to skip viewing a portion of programming. FIGS. 2A-2D depict a sequence of states, over time, of the system of FIG. 1A-1C.

In FIG. 2A the viewer 120 is depicted watching a program 130, being normally played back by the PVR 100 on the television display 110. The program 130 does not comprise a "must see", and does not comprise a "dependent section". The viewer 120 views the program 130 displayed on the television display 110. In the case depicted in FIG. 2A, the anti-skip module 105 need not take any special action.

In FIG. 2B the viewer 120 is depicted causing the PVR 100 to fast-forward through the commercial advertisement break 140. The PVR 100 displays the commercial advertisement break 140 being played in fast-forward mode as is well known in the art. The commercial advertisement break 140 comprises, by way of a non-limiting example, a "must see". Because the viewer 120 caused the PVR 100 to fast-forward through the commercial advertisement break 140, the anti-skip module 105 does not compute the function of the "must see" comprised within the commercial advertisement break 140.

In FIG. 2C the viewer 120 is depicted attempting to watch a continuation of the program 130, being normally played back from the PVR 100 on the television display 110, after the commercial advertisement break 140 has ended. The continuation of the program 130 comprises a "dependent section", the descrambling of which depends on the result of computing a function of the "must see".

In FIG. 2C the anti-skip module 105 has not computed a function of the "must see", and thus cannot use the result of the computation to descramble the "dependent section" comprised in the continuation of the program 130. The PVR 100, as described more fully below with reference to FIGS. 5A-5C, cannot display the continuation of the program 130. FIG. 2C depicts the PVR 100 causing the television display 110 to display the result of unsuccessfully descrambled content 200. For example, without limiting the generality of the foregoing, displaying the result of unsuccessfully descrambled content 200 may cause the television display 110 to display "static", a blue screen, an error message, a defined display for unsuccessful descrambling, etc.

Figure 2D:
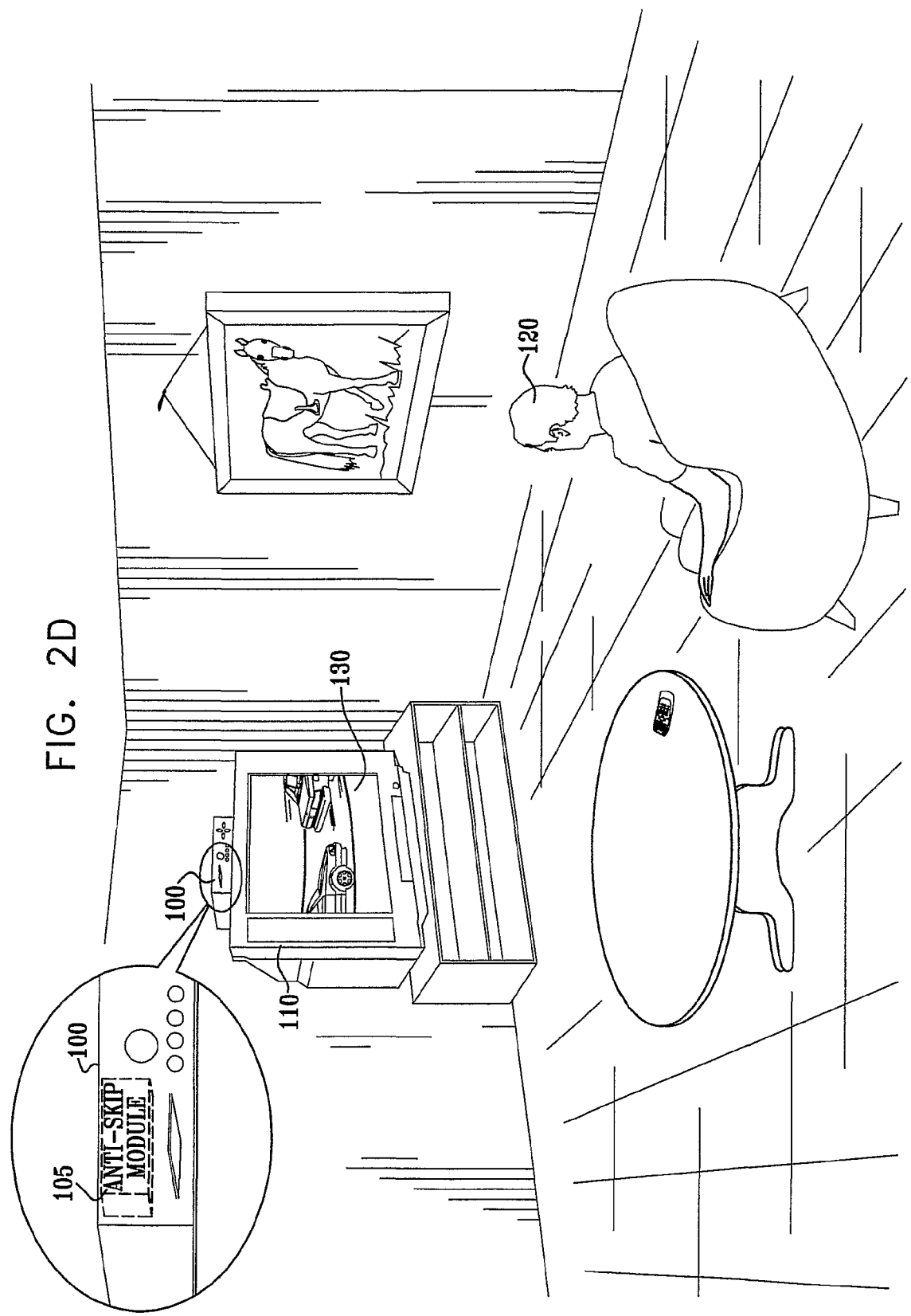

In FIG. 2D the viewer 120 is depicted watching a continuation of the program 130, being normally played back from the PVR 100 on the television display 110, at a later time. At the later time depicted in FIG. 2D, the continuation of the program 130 no longer comprises a "dependent section". In the case depicted in FIG. 2D, the anti-skip module 105 need not take any special action.

FIGS. 2A-2D thus depict a viewer 120, initially viewing a program 130, who then skips viewing a commercial advertisement break 140 by using a fast-forward feature of the PVR 100. The viewer 120 is subsequently prevented from viewing a section of the program 130 immediately following the commercial advertisement break 140. After some time the viewer 120 continues to view the further continuation of the program 130.

Figure 3A:
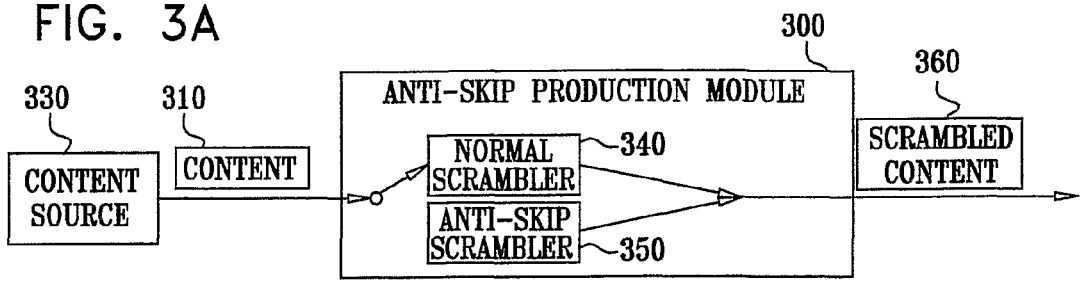
FIGS. 3A-3C are simplified functional block diagram illustrations of an anti-skip production module, useful for producing content for use in the system of FIGS. 1A-1C, the anti-skip production module being constructed and operative in accordance with another preferred embodiment of the present invention.
Figure 3B:
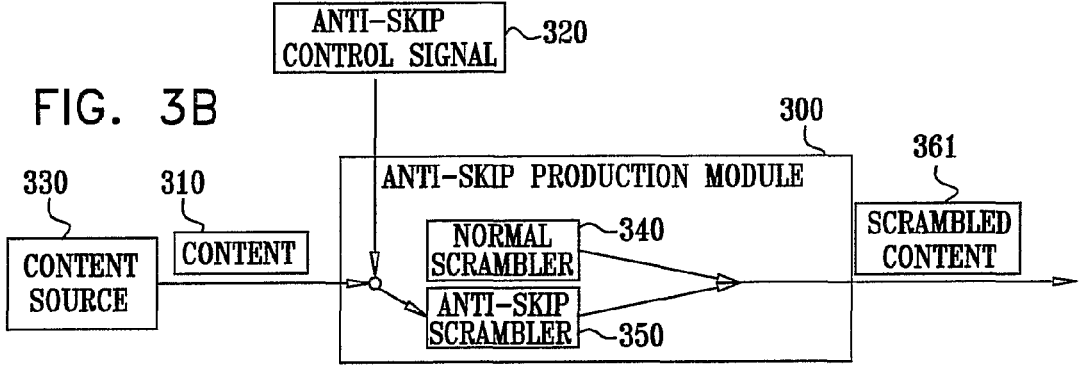
Figure 3C:
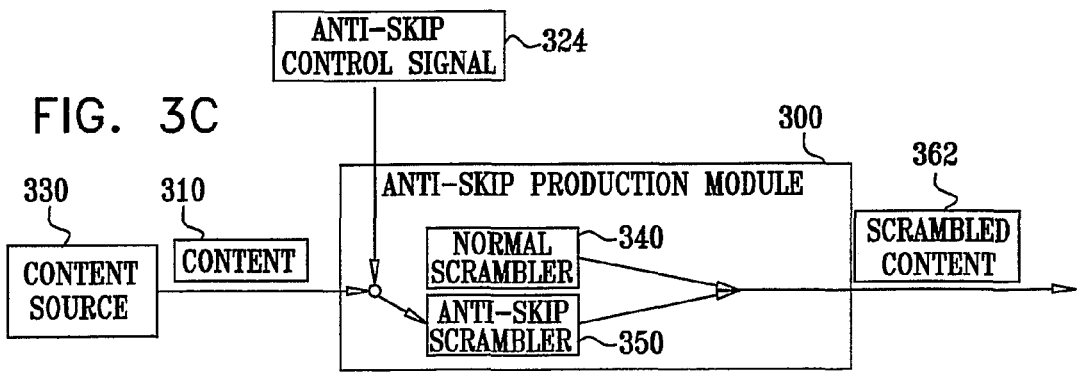

Reference is now made to FIGS. 3A-3C, which are simplified functional block diagram illustrations of an anti-skip production module, useful for producing content for use in the system of FIGS. 1A-1C, the anti-skip production module being constructed and operative in accordance with another preferred embodiment of the present invention.

FIG. 3A depicts an anti-skip production module 300, accepting content 310 from a content source 330, and producing scrambled content 360. A normal scrambler 340 and a special anti-skip scrambler 350 are comprised within the anti-skip production module 300.

In FIG. 3A the anti-skip production module 300 routes the input of the content 310 through the normal scrambler 340, producing output of the scrambled content 360, without a "must see" and without a "dependent section".

FIG. 3B depicts the anti-skip production module 300 of FIG. 3A, receiving an anti-skip control signal 320. The anti-skip control signal 320 is preferably provided by content producers or broadcasters producing content for broadcasting.

In FIG. 3B the anti-skip control signal 320 indicates to the anti-skip production module 300 that the current section of content 310 is a "must see". The anti-skip production module 300 routes the content 310 through the anti-skip scrambler 350, producing scrambled content 361 as output from the anti-skip production module 300. The anti-skip production module 300 causes the anti-skip scrambler 350 to compute a disguising function of the content 310, producing a result (not shown). Preferred methods of computing the disguising function of the "must see" content are described in more detail below with reference to FIGS. 6A-9B.

The scrambled content 361, which is the output of the anti-skip production module 300, also comprises meta-data. The meta-data provides indications of a beginning and of an end of the "must see" to consumers of the scrambled content.

FIG. 3C depicts the anti-skip production module 300 of FIG. 3A, receiving an anti-skip control signal 324. The anti-skip control signal 324 is preferably provided by content producers or broadcasters producing content for broadcasting.

In FIG. 3C the anti-skip control signal 324 indicates to the anti-skip production module 300 that the current section of content 310 is a "dependent section". The anti-skip production module 300 routes the content 310 through the anti-skip scrambler 350, producing scrambled content 362 as output from the anti-skip production module 300. The anti-skip production module 300 causes the anti-skip scrambler 350 to scramble the content 310 using the result (not shown) of computing the disguising function of the content 310 as described above with reference to FIG. 3B. Preferred methods of using the result (not shown) of computing the disguising function of the content 310 to scramble the content 310 are described in more detail below with reference to FIGS. 6A-9B.

The scrambled content 362, which is the output of the anti-skip production module 300, also comprises meta-data. The meta-data provides indications of a beginning and of an end of the "dependent section" to consumers of the scrambled content.

After the end of the "dependent section" has been input to the anti-skip production module 300, the anti-skip control signal 324 (FIG. 3C) is no longer provided to the anti-skip production module 300. The anti-skip production module 300 now preferably returns to the state depicted in FIG. 3A.

Reference is now made to FIGS. 4A-4C, which are simplified functional block diagram illustrations of an anti-skip production module, useful for producing content for use in the system of FIGS. 1A-1C, the anti-skip production module being constructed and operative in accordance with still another preferred embodiment of the present invention.

FIG. 4A depicts an anti-skip production module 400, accepting as input content 310 from a content source 330, and producing scrambled content 430. A normal scrambler 410 and a special anti-skip scrambler 420 are comprised within the anti-skip production module 400.

In FIG. 4A the anti-skip production module 400 routes the input of the content 310 through the normal scrambler 410, producing output of the scrambled content 430, without a "must see" and without a "dependent section".

FIG. 4B depicts the anti-skip production module 400 of FIG. 4A, receiving an anti-skip control signal 440. The anti-skip control signal 440 is preferably provided by content producers or broadcasters producing content for broadcasting.

In FIG. 4B the anti-skip control signal 440 indicates to the anti-skip production module 400 that the current section of content 310 is a "must see". The anti-skip production module 400 routes the content 310 through the normal scrambler 410, followed by the anti-skip scrambler 420, producing the anti-skip production module 400 output of scrambled content 431. The anti-skip production module 400 causes the anti-skip scrambler 420 to compute a disguising function of the content 310, producing a result (not shown). Preferred methods of computing the disguising function of the "must see" content are described in more detail below with reference to FIGS. 6A-9B.

The scrambled content 431, which is the output of the anti-skip production module 400, also comprises meta-data. The meta-data provides indications of a beginning and of an end of the "must see" to consumers of the scrambled content.

FIG. 4C depicts the anti-skip production module 400 of FIG. 4A, receiving an anti-skip control signal 442. The anti-skip control signal 442 is preferably provided by content producers or broadcasters producing content for broadcasting.

In FIG. 4C the anti-skip control signal 442 indicates to the anti-skip production module 400 that the current section of content 310 is a "dependent section". The anti-skip production module 400 routes the content 310 through the normal scrambler 410, followed by the anti-skip scrambler 420, which performs additional scrambling, producing the anti-skip production module 400 output of scrambled content 432. The anti-skip production module 400 causes the anti-skip scrambler 420 to scramble the output of the normal scrambler 410 using the result (not shown) of computing the disguising function of the content 310, as described with reference to FIG. 4B. Preferred methods of using the result (not shown) of computing the disguising function of the content 310 to scramble the content 310 are described in more detail below with reference to FIGS. 6A-9B.

The scrambled content 432, which is the output of the anti-skip production module 400, also comprises meta-data. The meta-data provides indications of a beginning and of an end of the "dependent section" to consumers of the scrambled content.

After the end of the "dependent section" has been input to the anti-skip production module 400, the anti-skip control signal 442 (FIG. 4C) is no longer provided to the anti-skip production module 400. The anti-skip production module 400 now preferably returns to the state depicted in FIG. 4A.

Figure 5A:
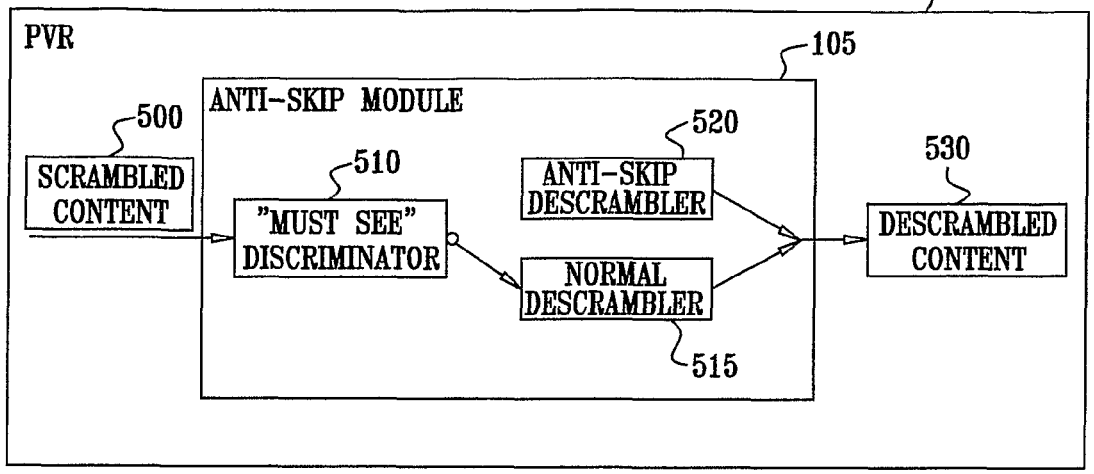
FIGS. 5A-5C are simplified functional block diagram illustrations of a preferred implementation of the PVR of FIGS. 1A-1C.
Figure 5B:
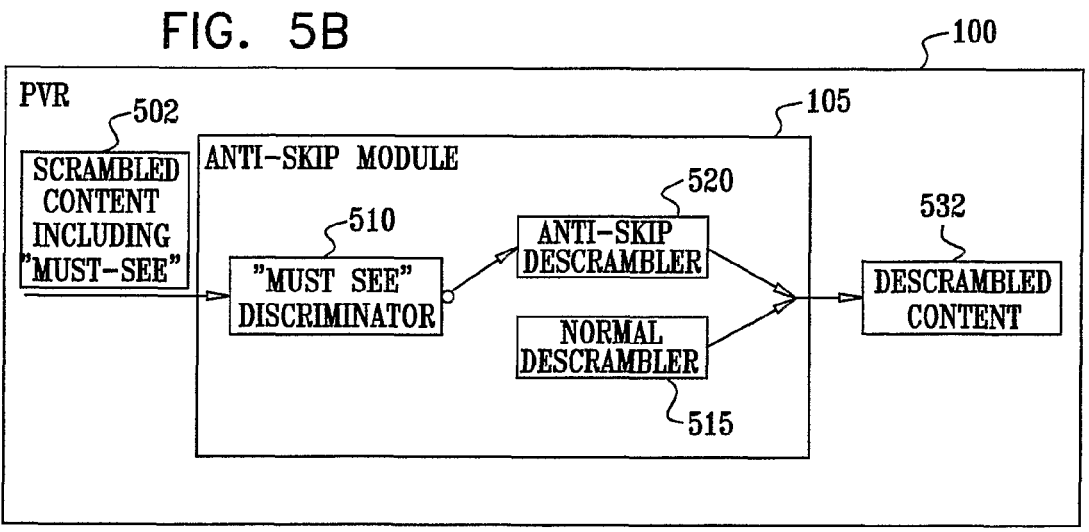
Figure 5C:
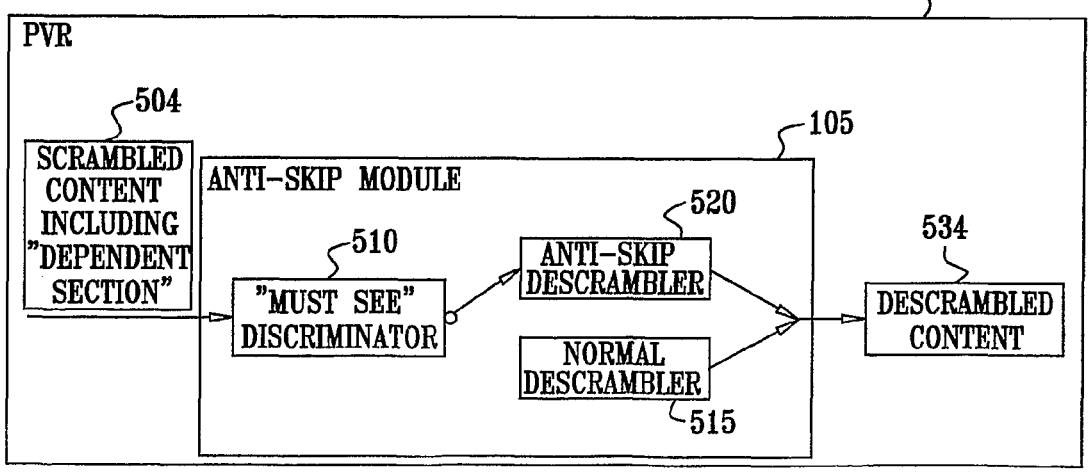

Reference is now made to FIGS. 5A-5C, which are simplified functional block diagram illustrations of a preferred implementation of the PVR 100 of FIGS. 1A-1C.

FIG. 5A depicts a PVR 100, comprising an anti-skip module 105. The anti-skip module 105 comprises a "must see" discriminator 510, a normal descrambler 515, and an anti-skip descrambler 520.

In FIG. 5A the PVR 100 plays back recorded scrambled content 500. The anti-skip module 105 accepts the scrambled content 500 which does not contain a "must see" or a "dependent section". The "must see" discriminator 510 comprised within the anti-skip module 105 routes the scrambled content 500 through the normal descrambler 515, producing descrambler content 530, which is the output of the anti-skip module 105.

FIG. 5B depicts the PVR 100 of FIG. 5A, playing back recorded scrambled content including "must see" 502. The scrambled content including "must see" 502 comprises a "must see", and the meta-data associated with a "must see". The scrambled content including "must see" 502 is provided as input to the anti-skip module 105. The "must see" discriminator 510 identifies the meta-data indicating the presence of a "must see", and routes the scrambled content including "must see" 502 through the anti-skip descrambler 520, producing descrambled content 532, which is the output of the anti-skip module 105.

The "must see" discriminator 510 also causes the anti-skip descrambler 520 to compute a disguising function of the scrambled content including "must see" 502, producing a result (not shown). Preferred methods of computing the disguising function of the "must see" are described in more detail below with reference to FIGS. 6A-9B.

It is to be appreciated that computing a disguising function based on content of the "must see" is preferably performed at the same time as the "must see" is being played back normally.

In an alternative preferred embodiment of the present invention, when the meta-data indicates a beginning of the scrambled content including "must see" 502, the anti-skip module 105 causes the PVR 100 to start copying the scrambled content including "must see" 502 into a separate buffer (not shown). When the meta-data indicates the end of the scrambled content including "must see" 502, an end of the copy is marked in the separate buffer (not shown), and copying is stopped. Computation of a result of the disguising function based on the copy of the scrambled content including "must see" 502 is performed before the result is required for descrambling a "dependent section", or alternatively, when the result is required for descrambling a "dependent section", as described in more detail with reference to FIG. 5C.

In yet another alternative preferred embodiment of the present invention, when the meta-data indicates the beginning of the scrambled content including "must see" 502, a first pointer is set, pointing to the beginning of the PVR 100 recording of the scrambled content including "must see" 502. When the meta-data indicates the end of the scrambled content including "must see" 502, a second pointer is set, pointing to the end of the PVR recording of the scrambled content including "must see" 502. Computation of a result of the disguising function is based on the PV-R recording of the scrambled content including "must see" 502 comprised between the first pointer and the second pointer. Computation of the result is performed before the result is required for descrambling the "dependent section", or alternatively when the result is required for descrambling the "dependent section", as described in more detail with reference to FIG. 5C.

It is to be appreciated that the meta-data can comprise indications of: the beginning and end of a "must see"; the beginning and length of a "must see"; and other suitable indications of the presence of a "must see".

FIG. 5C depicts the PVR 100 of FIG. 5A, playing back recorded scrambled content including "dependent section" 504. The scrambled content including "dependent section" 504 comprises a "dependent section", and the meta-data associated with a "dependent section". The scrambled content including "dependent section" 504 is provided as input to the anti-skip module 105. The "must see" discriminator 510 identifies the meta-data indicating the presence of a "dependent section", and routes the scrambled content including "dependent section" 504 through the anti-skip descrambler 520, producing descrambled content 534, which is the output of the anti-skip module 105.

The "must see" discriminator 510 causes the anti-skip descrambler 520 to descramble the scrambled content including "dependent section" 504, using the result (not shown) of the computing a disguising function of the scrambled content including "must see" 502 described with reference to FIG. 5B. Preferred methods of descrambling the "dependent section" are described in more detail below with reference to FIGS. 6A-9B.

In case the anti-skip descrambler 520 does not have the results (not shown) of the computing a disguising function of the scrambled content including "must see" 502, the anti-skip descrambler 520 cannot successfully descramble the scrambled content including "dependent section" 504. The above case happens when a user of the PVR 100 attempt to skip the "must see", or starts playing back content from a dependent section without first playing back a preceding "must see". The output of the anti-skip descrambler 520 is unsuccessfully descrambled content (not shown), which, when provided to a television display (not shown), may cause the television display (not shown) to display, by way of a non-limiting example, "static", a blue screen, an error message, a defined display for unsuccessful descrambling, etc.

After the end of the scrambled content including "dependent section" 504 has been played back by PVR 100 as input to the anti-skip module 105, the PVR 100 continues playing back scrambled content without a "must see" and without a "dependent section". The anti-skip module 105 now preferably returns to the state depicted in FIG. 5A.

Reference is now made to FIG. 6A and 6B, which are simplified pictorial illustrations of portions of a recorded content item, useful in understanding a preferred embodiment of the system of FIGS. 1A-1C.

FIG. 6A depicts a portion of a recorded content item 600. The portion of a recorded content item 600 comprises several sub-portions, depicted in order, from left to right. The order of the sub-portions within the recorded content item 600 corresponds to the order of normal playback of the sub-portions when the recorded content item 600 is played back, for example, and without limiting the generality of the foregoing, on a PVR.

In FIG. 6A, a first sub-portion 610 of the portion of the recorded content item 600 represents a portion of a recorded program, such as, by way of a non-limiting example, a portion of the program 130 of FIGS. 1A and 2A.

A second sub-portion 620 of the portion of the recorded content item 600 comprises a "must see", and represents, by way of a non-limiting example, a commercial advertisement break such as the commercial advertisement break 140 of FIGS. 1B and 2B.

A third sub-portion 630 of the portion of the recorded content item 600 comprises a "dependent section", and represents, by way of a non-limiting example, a sub-portion of the program 130 depicted in FIGS. 1C and 2C. The third sub-portion 630 can also represent a beginning of a program different from the program 130 of FIGS. 1C and 2C.

The fourth sub-portion 640 of the portion of the recorded content item 600 depicts a portion of a program not comprising a "dependent section". The fourth sub-portion 640 represents, by way of a non-limiting example, the program 130 at a later time after the commercial advertisement break 140, as depicted in FIG. 2D. The fourth sub-portion 640 can also represent a beginning of a different program (not shown), as described above.

In a preferred embodiment of the present invention, the disguising function is a hash function, which is applied to the second sub-portion 620. A preferred hash function is SHA-1 (Secure Hash Standard, see FIPS 180-1 referenced above). The third sub-portion 630 is scrambled based, at least in part, on the result of applying the hash function; thus, in order to descramble the third sub-portion 630, the result of applying the hash function is needed. The fourth sub-portion 640 is either scrambled or not scrambled, but the result of applying the hash function is in either case not needed in order to descramble the fourth sub-portion 640.

A preferred algorithm for scrambling and descrambling the third sub-portion 630 is XOR. An alternative preferred embodiment of the current invention uses DES or AES as a scrambling and descrambling algorithm for scrambling and descrambling the third sub-portion 630. The embodiment which uses XOR as the preferred algorithm for scrambling and descrambling is faster to compute and less secure than the alternative preferred embodiment which uses DES or AES as the scrambling and descrambling algorithm.

It is to be appreciated that in some preferred embodiments of the present invention, the second sub-portion 620 is produced by applying the disguising function to only a portion of the commercial advertisement break 140 of FIGS. 1B and 2B.

It is common in the art to broadcast and to record scrambled programs. Persons skilled in the art will appreciate that when the program 130 of FIGS. 1A-1C and 2A-2D is scrambled, and when the sub-portions of the portion of a recorded content item 600 representing the portions of the program 130 are scrambled, the current invention does not depend on which algorithm is used for scrambling and descrambling. By way of a non-limiting example, if the scrambling algorithm of the first sub-portion 610 is DVB_CSA (DVB Common Scrambling Algorithm), the scrambling algorithm of the third sub-portion 630 and the fourth sub-portion 640 can be a continuation of the same scrambling algorithm DVB_CSA. The scrambling algorithm can also change at any point to some other algorithm, such as, by way of a non-limiting example, DES.

Persons skilled in the art will appreciate that in case the second sub-portion 620, representing the commercial advertisement break 140, is scrambled, one preferred embodiment of the present invention computes the result of the disguising function of the scrambled second sub-portion 620, while an alternative preferred embodiment of the present invention computes the result of the disguising function of the descrambled second sub-portion 620.

FIG. 6B depicts the second sub-portion 620 of FIG. 6A, and the third sub-portion 630 of FIG. 6A. FIG. 6B depicts the second sub-portion 620 and the third sub-portion 630 being of unequal size. In computing a disguising function of the second sub-portion 620 and using the result of the computing to descramble the third sub-portion 630, it is unimportant whether the second sub-portion 620 is smaller in size than the third sub-portion 630, equal in size to the third sub-portion 630, or larger in size than the third sub-portion 630. In the preferred embodiment of the present invention depicted by FIGS. 6A and 6B, the result of computing the disguising function of the entire second sub-portion 620 is used for descrambling the entire third sub-portion 630, which is why the size of sub-portion 620 in relation to sub-portion 630 is unimportant.

Reference is now made to FIGS. 7A and 7B, which are simplified pictorial illustrations of the portions of the recorded content item of FIG. 6A, useful in understanding an alternative preferred embodiment of the system of FIGS. 1A-1C.

FIG. 7A depicts a portion of a recorded item 700, comprising sub-portions corresponding in order, content, and function to the sub-portions depicted in FIG. 6A. The portion of a recorded item 700 of FIG. 7A corresponds to the portion of a recorded item 600 of FIG. 6A; sub-portion 710 of FIG. 7A corresponds to sub-portion 610 of FIG. 6A; sub-portion 720 of FIG. 7A corresponds to sub-portion 620 of FIG. 6A; sub-portion 730 of FIG. 7A corresponds to sub-portion 630 of FIG. 6A; and sub-portion 740 of FIG. 7A corresponds to sub-portion 640 of FIG. 6A.

FIG. 7B depicts the second sub-portion 720 of FIG. 7A, and the third sub-portion 730 of FIG. 7A. In an alternative preferred embodiment of the current invention, as depicted in FIG. 7B, a disguising function of a sub-sub-portion 722 of the second sub-portion 720 is computed, and the result of the computation is used to scramble a corresponding, equal-sized sub-sub-portion 732 of the third sub-portion 730. The entire third sub-portion 730 is scrambled, sub-sub-portion by sub-sub-portion, using the results of computing the disguising function of corresponding sub-sub-portions in the second sub-portion 720.

By way of a non-limiting example, the size of the sub-sub-portion 722 and the sub-sub-portion 732 could be one byte. The bytes in the second sub-portion 720, representing the commercial advertisement break 140, are numbered CB0 through CBn. A byte DFx in the third sub-portion 730, representing data following the commercial advertisement break 140, can only be decrypted using an unscrambling function F(CBx, DFx). A preferred choice of the function F, such as XOR, AES, and DES, has been described above.

Reference is now made to FIGS. 8A and 8B, which are simplified pictorial illustrations of the portions of the recorded content item of FIG. 7A, useful in understanding the alternative preferred embodiment depicted in FIG. 7A, operating when the portions are not equal in size.

FIG. 8A depicts a portion of a recorded item 800, comprising sub-portions corresponding in order, content, and function to the sub-portions depicted in FIG. 6A. The portion of a recorded item 800 of FIG. 8A corresponds to the portion of a recorded item 600 of FIG. 6A; sub-portion 810 of FIG. 8A corresponds to sub-portion 610 of FIG. 6A; sub-portion 820 of FIG. 8A corresponds to sub-portion 620 of FIG. 6A; sub-portion 830 of FIG. 8A corresponds to sub-portion 630 of FIG. 6A; and sub-portion 840 of FIG. 8A corresponds to sub-portion 640 of FIG. 6A.

FIG. 8B depicts the second sub-portion 820 of FIG. 8A, and the third sub-portion 830 of FIG. 8A, in a case where the third sub-portion 830 is larger than the second sub-portion 820. In an alternative preferred embodiment of the present invention, as depicted in FIG. 8B, a disguising function of a sub-sub-portion 823 of the second sub-portion 820 is computed, and the result of the computation is used to scramble a corresponding, equal-sized sub-sub-portion 833 of the third sub-portion 830.

Since the third sub-portion 830 is larger than the second sub-portion 820, and since the sub-sub-portion 833 is equal in size to sub-sub-portion 823, the method described above suffices for descrambling the third sub-portion 830 only up to a point equal in size to the second sub-portion 820, which corresponds to the leftmost point marked 835 in the third sub-portion 830. From the leftmost point marked 835 in the third sub-portion 830, the results of computing the disguising function of the sub-sub-portions of sub-portion 820 are used again to scramble equal-sized sub-sub-portions of the third sub-portion 830, up to the second leftmost point marked 835 on the third sub-portion 830, and so on.

If the size of the third sub-portion 830 is not an integer multiple of the size of the second sub-portion 820, then a last, fractional, sub-sub-portion of the third sub-portion 830 is scrambled, a sub-sub-portion at a time, using the results of computing the disguising function of corresponding equal-sized sub-sub-portions of the second sub-portion 820.

Persons skilled in the art will appreciate that if the third sub-portion 830 of FIGS. 8A and 8B is smaller than the second sub-portion 820 of FIGS. 8A and 8B, then the third sub-portion 830 is scrambled a sub-sub-portion at a time using the results of computing the disguising function of corresponding equal-sized sub-sub-portions of the second sub-portion 820.

As in the description for FIG. 7B above, by way of a non-limiting example, the size of the sub-sub-portion 823 and the sub-sub-portion 833 can be one byte.

Reference is now made to FIGS. 9A and 9B, which are simplified pictorial illustrations of the portions of the recorded content item of FIG. 7A, useful in understanding another alternative preferred embodiment of the system of FIGS. 1A-1C.

FIG. 9A depicts a portion of a recorded item 900, comprising sub-portions corresponding in order, content, and function to the sub-portions depicted in FIG. 6A. The portion of a recorded item 900 of FIG. 9A corresponds to the portion of a recorded item 600 of FIG. 6A; sub-portion 910 of FIG. 9A corresponds to sub-portion 610 of FIG. 6A; sub-portion 920 of FIG. 9A corresponds to sub-portion 620 of FIG. 6A; sub-portion 930 of FIG. 9A corresponds to sub-portion 630 of FIG. 6A; and sub-portion 940 of FIG. 9A corresponds to sub-portion 640 of FIG. 6A.

FIG. 9B depicts the second sub-portion 920 of FIG. 9A, and the third sub-portion 530 of FIG. 9A.

FIG. 9B depicts the second sub-portion 920 and the third sub-portion 930 in a case where the third sub-portion 930 is larger than the second sub-portion 920. In an additional alternative preferred embodiment of the present invention, as depicted in FIG. 9B, a disguising function of a sub-sub-portion 924 of the second sub-portion 920 is computed, and the result of the computation is used to scramble a corresponding, larger sub-sub-portion 934 of the third sub-portion 930. Sub-sub-portion 934 of the third sub-portion 930 is larger than sub-sub-portion 924 of the second sub-portion 920 by the same factor as the third sub-portion 930 is larger than the second sub-portion 920.

Persons skilled in the art will appreciate that if the third sub-portion 930 is smaller than the second sub-portion 920, then it is necessary and sufficient to substitute "smaller" for every "larger" in the description of FIG. 9B above.

Reference is now made to FIG. 10 which is a simplified flowchart illustration of a preferred method of producing scrambled content for use in the system of FIGS. 1A-1C. The method of FIG. 10 is self-explanatory in light of the above discussion of FIGS. 3A-4C.

Figure 11:
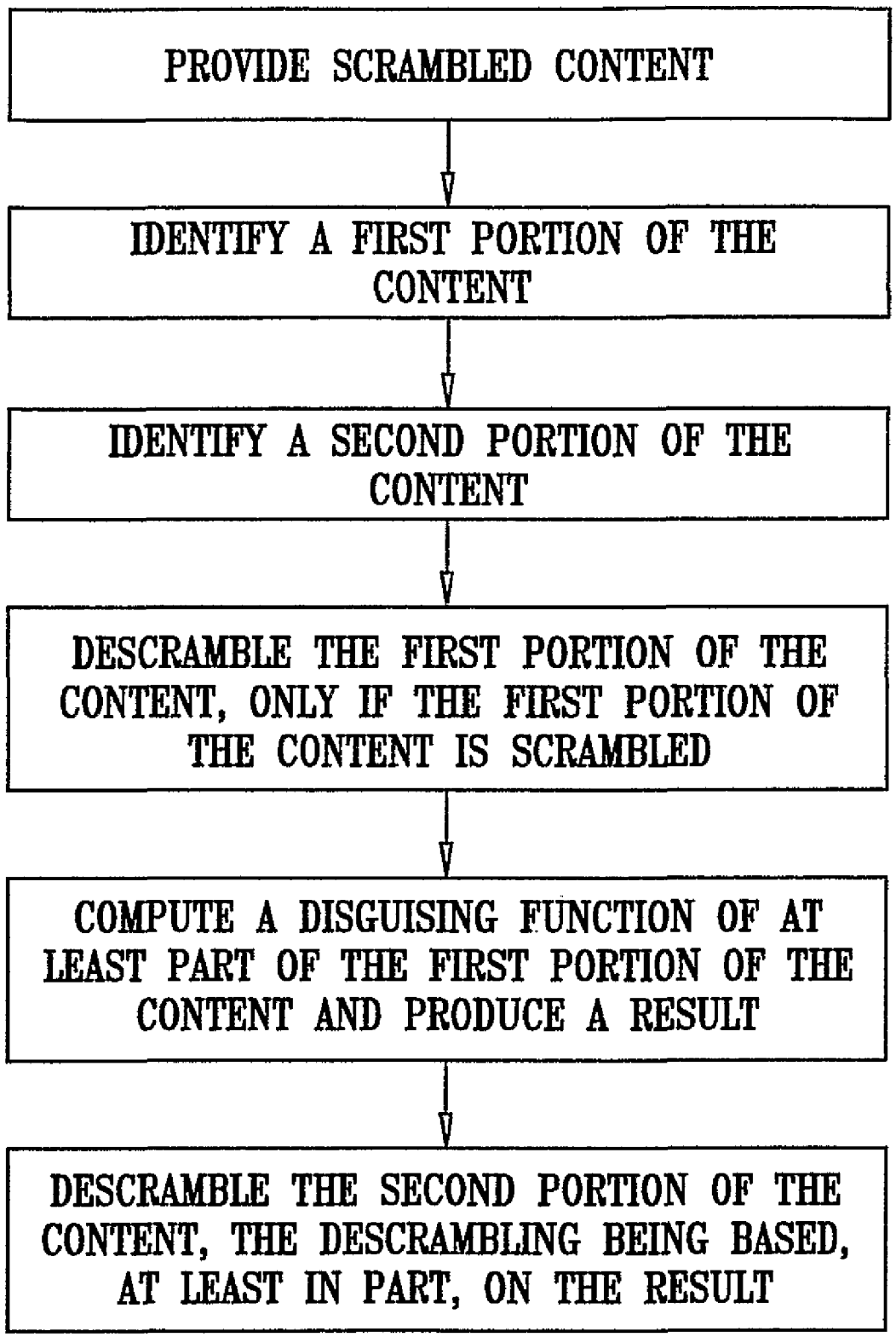
FIG. 11 is a simplified flowchart illustration of a preferred method of using scrambled content in the system of FIGS. 1A-1C.

Reference is now made to FIG. 11 which is a simplified flowchart illustration of a preferred method of using scrambled content in the system of FIGS. 1A-1C. The method of FIG. 11 is self-explanatory in light of the above discussion of FIGS. 5A-5C.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for permitting a viewer to view content, the method comprising:

provoding the content, where at least part of the content is scrambled;

identifying a first portion of the content as "must see" content based on meta-data in the content that indicate a beginning and an end of the "must see" content, the "must see" content comprising a plurality of "n" adjacent sub-portions;

identifying a second portion of the content as "dependent" content based on meta-data in the content that indicate a beginning and an end of the "dependent" content, the "dependent" content being scrambled, the "dependent" content comprising a series of more than "n" sub-portions;

descrambling the "must see" content, only if the "must see" content-is scrambled;

only if the "must see" content is played back in a normal mode as opposed to a trick mode, separately producing "n" respective sub-results by computing a hash for each of the "n" sub-portions of the "must see" content, descrambling each one of a first "n" sub-portions of the series of sub-portions of the "dependent" content utilizing a respective one of the "n" sub-results, and descrambling each one of the remaining sub-portions of the series of sub-portions of the "dependent" content, utilizing a sub-result that is different from an immediately preceding sub-result utilized to descramble an immediately preceding sub-portion in the series so that each sub-portion in the series is descrambled; and if the "must see" content is not played back in the normal mode, preventing the "dependent" content from being descrambled.

2. The method according to claim 1 and wherein the "dependent" content is adjacent to the "must see" content.

3. The method according to claim 1 and wherein the content comprises at least one of the following: video content; audio content; and audio-video content.

4. The method according to claim 1 and wherein the hash function comprises SHA-1.

5. The method according to claim 1 and wherein the descrambling of the "dependent" content comprises descrambling using an exclusive-or (XOR) method.

6. The method according to claim 1 and wherein the descrambling of the "dependent" content comprises descrambling using a DES method.

7. The method according to claim 1 and wherein the descrambling of the "dependent" content comprises descrambling using an AES method.

8. The method according to claim 1 and wherein each of the "n" sub-portions of the "must see" content comprises exactly one byte.

9. The method of claim 1 and wherein the computing is performed in real-time.

10. The method of claim 1 and wherein the computing is performed before the sub-results are required for descrambling.

11. The method according to claim 1, wherein each of the sub-portions of the "dependent" content comprises exactly one byte.

12. The method according to claim 1, wherein each one of the "n" sub-portions of the "must see" content is equal in size, respectively, to each corresponding sub-portion of the "dependent" content, a particular sub-portion of the "dependent" content corresponding to a particular sub-portion of the "must see" content" if descrambling of the particular sub-portion of the "dependent" content utilizes a particular sub-result produced by computing a hash for the particular sub-portion of the "must see" content.

13. Apparatus for viewing content, the apparatus comprising:

a discriminator for identifying a first portion of the content as "must see" content based on meta-data in the content that indicate a beginning and an end of the "must see" content, the "must see" content comprising a plurality of "n" adjacent sub-portions; and for identifying a second portion of the content as "dependent" content based on meta-data in the content that indicate a beginning and an end of the "dependent" content, the "dependent" content being scrambled, the "dependent" content comprising a series of more than "n" sub-portions; and an anti-skip descrambler for:

descrambling the "must see" content, only if the "must see" content of the content is scrambled;

only if the "must see" content is played back in a normal mode as opposed to a trick mode, separately producing "n" respective sub-results by computing a hash for each of the "n" sub-portions of the "must see" content, descrambling each one of a first "n" sub-portions of the series of sub-portions of the "dependent" content utilizing a respective one of the "n" sub-results, and descrambling each one of the remaining sub-portions of the series of sub-portions of the "dependent" content, utilizing a sub-result that is different from an immediately preceding sub-result utilized to descramble an immediately preceding sub-portion in the series so that each sub-portion in the series is descrambled; and if the "must see" content is not played back in the normal mode, preventing the "dependent" content from being descrambled.

14. Apparatus according to claim 13 and also comprising:

a normal descrambler for descrambling another portion of the content without utilizing any of the sub-results.

* * * * *

UNITED STATES PATENT AND TRADEMARK OFFICE
CERTIFICATE OF CORRECTION

| | | |
|---|---|---|
| PATENT NO. | : 8,355,506 B2 | Page 1 of 1 |
| APPLICATION NO. | : 11/992614 | |
| DATED | : January 15, 2013 | |
| INVENTOR(S) | : Perry Smith | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 834 days.

Signed and Sealed this
Eighteenth Day of November, 2014

Michelle K. Lee
*Deputy Director of the United States Patent and Trademark Office*